United States Patent Office 2,962,115
Patented Nov. 29, 1960

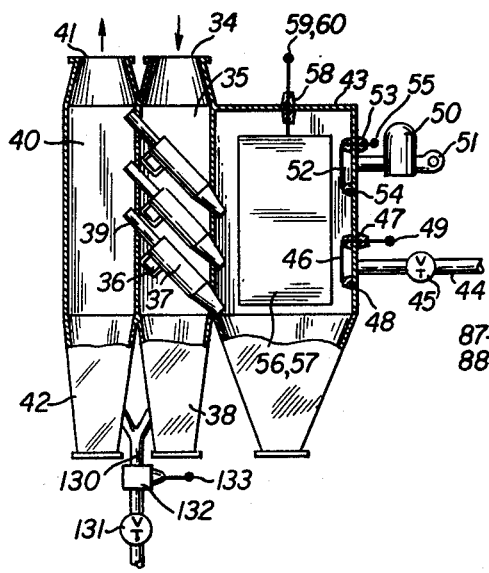

2,962,115

APPARATUS FOR SEPARATING SOLID AND LIQUID PARTICLES FOR GASES AND VAPOURS

Otto Schmid, 24 Kennelbacherstrasse, Bregenz, Austria

Filed Feb. 25, 1957, Ser. No. 642,168

Claims priority, application Germany Feb. 25, 1956

2 Claims. (Cl. 183—7)

The invention relates to apparatus for separating solid or liquid particles from gases or vapours by the action of inertia forces, the apparatus being of the kind having at least one settling container for the particles to be separated out.

The operation of one known group of separators of this kind, i.e. the so-called centrifugal separators, consists in imparting a rapid rotating motion to the gases to be cleansed or purified in a centrifugal chamber by means of a suitable inlet baffle device, for example a tangential gas inlet or an axial spinning device or the like, whereby the particles to be separated are forced on to the centrifugal chamber wall as a result of centrifugal force acting thereon. Due to the force of gravity and any secondary flows which may exist, the particles are then passed into a settling container of any desired shape and are deposited on the floor of this settling container under the influence of gravity. The gas leaves the separator in a more or less pure form through a central discharge tube. It is also known to provide several centrifugal chambers with a common settling container, viz. multi-cyclones, whirling devices and the like.

The purpose of the settling container of all the aforesaid separators is to insure that the suspended particles separated from the main gas stream by the action of inertia forces and supplied to the settling container are drawn down by gravity on to the bottom and said settling container from which bottom the particles can be removed periodically or continuously by suitable means.

The disadvantage of such separators is that, for the separation of the particles to be removed from the main gas flow and for conveying the same into the settling container, inertia forces are produced having a centrifugal acceleration which can amount to several times the acceleration due to gravity, but no additional measures are taken in the settling container itself for the rapid separation of said particles, the separation merely being left to the effect of gravity. Depending on the speed of fall of the particles to be separated, the latter fall at a higher or slower speed on to the floor of the settling container for removal therefrom. Large particles with a high speed of fall quickly drop on to the floor of the settling container, while finer particles with a lower speed of fall, such as dust and the like, drop at a correspondingly slower rate. Thus due to the fact that always new suspended particles are flowing into the settling container, differing degrees of concentration of suspended particles in the latter are formed, the degrees corresponding to the speed of descent of the said particles. The lower the speed of descent of a specific class of grain sizes of these particles, the higher will be the concentration of the said class in the settling container.

Those particles reaching the settling container which have a grain size smaller than, for example, 1 micron which particles already follow the Brown molecular motion, can in practice not be deposited on the settling container bottom under the influence of gravity. Therefore, they can not be separated out, although the inertia forces generated for the separation of suspended particles, i.e. forces up to 1000 times the acceleration due to gravity and higher, can be very well adapted for separating these ultra-fine particles from the main gas flow and conducting them into the settling container.

Since in the afore-described separators, a certain amount of gas passes into the settling container together with the particles which are to be separated out, which amount of gas returns more or less regularly into the main gas stream again, for example in the form of irregularly released gas bubbles, and escapes with the purified gas, and since these bubbles entrain with them a part of the suspended particles, the separation efficiency of such separators for fine particles is considerably lowered.

A main object of the invention is to provide a generally improved separator in which the concentration of fine particles in the settling container is substantially reduced to increase the efficiency of the separator.

It is known to connect several separators in series and to equip these separators with internal fittings or devices for influencing the suspended particles in order to reduce the content of the latter in the pure gas stream. The disadvantage of these known arrangements is that the entire gas volume must be handled by each of the series-connected separators, the result of this being that not only are the dimensions of the separate separators made large, but in addition only short operative periods are available for influencing the suspended particles, due to the large amounts of gas which are passed through and the high gas velocities caused thereby.

In accordance with a limited aspect of the invention, the foregoing disadvantage is obviated by arranging the means for weighting and/or agglomerating the suspended particles in the settling container. The settling container, which is not traversed by the main gas stream, is arranged in any suitable manner; the dust concentration is substantially higher in the settling container than in the main gas stream and the operative period on the suspended particles is extraordinarily long. It is apparent from this that means influencing the suspended particles in the settling container can be extremely effective while being comparatively small in size.

One embodiment of the invention can include a liquid atomiser. The liquid, for example water, to which a wetting agent may also be added for producing a better wetting effect, is introduced in an atomised condition, such as in the form of an erosol mist, into the settling container, or is atomised into the latter. By addition of the liquid droplets to the suspended particles, the latter are made heavier and are able to stick to larger units owing to the wetting. In order to produce a complete addition to the suspended particles, the liquid droplets can be charged electrically, for example, by the liquid atomiser which is electrically insulated and connected to a source of high voltage or by the aerosol mist issuing from the liquid atomiser being electrically charged. An accelerated addition of the liquid droplets to the suspended particles and an accelerated adhesion of the particles weighted with liquid can also be effected by ultrasonic generators which excite the suspended particles to vibrations of different amplitude, depending on their mass. The generators are fitted in the settling container or built on to the latter.

For accelerated addition of electrically charged liquid droplets to the suspended particles and for the accelerated adhesion of the particles weighted with liquid, it is also possible to use an electric single-phase or multi-phase spraying or non-spraying alternating current field, by which the electrically charged particles are excited to oscillations of different amplitude, depending on their charging and mass.

As one arrangement according to the invention, it is also possible to use a steam pipe which opens into the settling container and through which the steam is introduced into the said container, or a steam generator can be arranged inside the settling container. In order to produce or to increase flow in the required direction, the introduction of the steam can take place through an injector.

The efficiency of this arrangement can also be increased by the steam introduced into the settling container or generated in the latter being charged electrically. Moreover, ultrasonic generators can be installed in or fitted on the settling container for accelerating the sticking effect or means can be provided which generate an electric single-phase or multi-phase spraying or non-spraying alternating current field in the settling container.

For the agglomeration of the suspended particles according to the invention, insulated spraying electrodes with opposite poles and operated by direct current can be fitted in the settling container, which electrodes alternately discharge positively and negatively in the container. The suspended particles of which some are positively charged and others negatively charged are united to form larger electrically neutral particles, it being possible for a larger positively charged particle to be united with several small negatively charged particles, and vice versa. Moreover, spraying electrodes can be installed in an insulated manner in the settling containers, these electrodes being fed with high voltage alternating current and also causing an agglomeration of the suspended particles.

It is an important advantage of the invention that for increasing the speed of descent and if necessary for separting the particles, the settling container can have arranged therein devices which are small and thus inexpensive owing to the slight gas movements in this container and that by this means the output of the complete apparatus is substantially improved.

Instead of the particle weight and/or agglomeration increasing means being arranged in the said container itself, these devices can also be arranged in a separate settling container which is connected in parallel with the settling container proper and which is traversed by a partial gas stream of the latter. The particles increased in weight in the parallel-connected settling container can be separated out in the latter or in the settling container proper after being returned thereto.

Finally, the particle weight and/or agglomeration increasing means can also be arranged in a known conduit for a partial gas flow and loading to the conduit or pipe for the untreated gas. This has the advantage that a separator in the conduit or pipe for the partial gas flow can be dispensed with, since the particles returned to the pipe for the untreated gas are so increased in grain size that they can reliably be separated quickly on passing through the main separator again.

In order that the invention may be clearly understood and readily carried into effect, a number of embodiments thereof will now be described in detail with reference to the accompanying diagrammatic drawings, in which:

Figures 1 and 2 are respectively an elevation and plan view of a centrifugal separator group with a non-spraying alternating current field arranged in a settling container, on which is fitted a liquid atomiser or steam supply system, and Figures 3 and 4 are respectively an elevation and plan view of a centrifugal separator group, having bipolar spraying electrodes and a steam supply system arranged in the settling container.

With a centrifugal separator group as shown in Figures 1 and 2, the untreated gas enters at 34, is distributed in an untreated gas chamber 35 and flows to gas inlets 36 of a number of centrifuging chambers 37. Relatively large particles will not enter the centrifuging chambers 37 but will merely pass into a coarse particle settling container 38. The cleansed gas which leaves the centrifuging chambers 37 through pure gas outlets 39, flows into a pure gas chamber 40 and is discharged upwardly through an outlet 41. Suspended particles entrained into the pure gas chamber 40 pass into a settling container 42.

The particles separated out in the centrifuging chambers 37 reach a main settling container 43. In order to increase the speed of descent of the suspended particles, the main settling container 43 has connected thereto a steam pipe 44, which supplies measured quantities of steam to the settling container through a throttle valve 45. Spraying electrodes 46 are arranged in the settling container behind the outlet of the steam pipe 44, so that steam entering the said container is electrically charged. The electrodes 46 are, by means of insulators 47 and 48, insulated with respect to the housing of the settling container 43. Current is supplied to the electrodes 46 through contacts 49, which can be connected to a high voltage source for direct or alternating current. Due to the electric charging of the steam, an increased affinity for the suspended particles is produced, so that the weighting and agglomeration thereof is accelerated.

A liquid atomiser 50 can be provided as an alternative instead of a steam supply system. The aerosol mist which is generated is supplied to the settling container by means of a fan 51. Disposed in the settling chamber 43 beyond the inlet of the aerosol mist are further spraying electrodes 52, which give an electric charge to the said mist, whereby there is also obtained an increased affinity of the aerosol mist for the suspended particles. The electrodes 52 are insulated from the housing by insulators 53 and 54. Current to said electrode 52 is supplied by a contact 55.

In order to achieve a more rapid increase in weight and agglomeration of the particles, the settling container has arranged therein the two electrode plates 56 and 57, which are insulated from the housing by insulators 58. Current to the plates 56 and 57 is supplied through contacts 59 and 60 respectively. If an alternating voltage is applied to the two non-spraying plates 56 and 57, an electric alternating field is produced between the said plates, which field imparts oscillations of different amplitude to the electrically charged particles, depending on the mass of the particles and electric charge on the plates. As a result of the oscillations of different amplitude, a more rapid agglomeration of the suspended particles is obtained. Since the particles which are not electrically charged do not participate in the oscillatory motion, a particularly effective weighting and agglomeration of the particles is produced by this arrangement.

Furthermore, in the settling containers 38 and 42 a common steam supply pipe 130 for the weighting and agglomeration of the particles may be provided. The pipe 130 supplies measured quantities of steam through a throttle valve 131 to the settling containers. Moreover, the steam can also be electrically charged by an apparatus 132 in which are located spraying electrodes. The supply of current to this apparatus is effected by an external electric contact 133.

Figures 3 and 4 show another centrifugal separator group with common settling containers. Untreated gas is passed via openings 61 into an untreated gas chamber 62, through tangential chamber inlets 63 into centrifuging chambers 64 and leaves the latter in cleansed form through pure gas pipes 65. Coarse particles are passed to a settling container 66, and particles which escape in the pure gas from the centrifuging chambers 64 reach a settling container 67. In a main settling container 68, which serves to accommodate the particles separated from the centrifuging chambers, are situated spraying electrodes 69, 70, 71 and 72 which are of opposite poles and which are operated by direct current, one electrode of each pair spraying a positive electric charge and the other a negative electric charge. The spraying electrodes are insulated from the housing by an insulator 73 and are in physical tension by a weight 74 arranged on each electrode. The particles in chamber 68, some of which are in this case given a positive electric charge and others of which are given a negative electric charge, are united to form larger electrically neutral particles.

The electrodes 69, 70, 71 and 72 can also be fed with high voltage alternating current, whereby the particles sweeping past the electrodes per unit of time are alternately positively and negatively charged and agglomerate to form relatively large particles with equalisation of the charges. This operation can be assisted by generating a regulated flow of air past the electrodes, so that new suspended particles are always supplied thereto per unit of time. For this purpose, it is possible to provide a plate 75 formed with longitudinal slots, this plate being insulated from the housing by insulators 76 and the longitudinal slots thereof being so arranged that the stream of gas passing therethrough impinges on the electrodes.

A fan 77 driven by an electric motor 76 generates circulating gas flow, in that it draws in gas from behind the separating plate 75 through opening 78 to pass the gas through a pipe line 79 and an opening 80 once more into the settling container 68 in front of the separating plate 75. Instead of the fan 77, it is also possible to use a steam injector which produces the required flow.

For increasing the weight and agglomeration of the suspended particles, the settling container can have steam supplied thereto through a steam pipe 81, the quantity of steam being regulated by a throttle valve 81a.

For agglomerating the suspended particles in the settling container 66, it is possible to provide insulated sputtering or spraying electrodes 82 and 82a which are of opposite poles and are operated with direct current, the electrode 82 for example spraying a positive electric charge and the electrode 82a a negative charge. Moreover, spraying electrodes 83 and 84 with opposite poles and operated with direct current can also be fitted in the fine particles settling container 67, the electrode 83 for example spraying a positive electric charge and the electrode 84 a negative charge. These electrodes are insulated from the housing walls by insulators 85 and are physically tensioned by the weight 86. The electrodes 82 and 83 spraying charges of like polarity can conveniently have a common current supply line 87, while the electrodes 82a and 84 which also spray charges of like polarity have a common current supply line 88. The electrodes 82, 82a and 83, 84 can also be fed with high-voltage alternating current, with which agglomeration of the particles is also produced.

What is claimed is:

1. A centrifugal separator of the cyclone type for separating solid and liquid particles from fluid by the action of inertia forces, said separator including at least one centrifuging chamber provided with an inlet for fluid to be processed and an outlet for separating fluid, said chamber including a conically tapered open lower end part providing an outlet for separated particles, a spinning device for imparting rotary movement to fluid passing into the chamber through said inlet, at least one settling container communicating with said conically tapered open lower end part of the chamber, said settling container being arranged to receive separated particles, moistening means disposed within said settling container and adapted to cause an increase in weight of said separated particles by agglomeration whereby the speed of descent of said particles in the settling container, due to gravity, is increased, and means providing an alternating current electrostatic field in said settling chamber to enhance agglomeration.

2. A centrifugal separator of the cyclone type for separating solid and liquid particles from fluid by the action of inertia forces, said separator including at least one centrifuging chamber provided with an inlet for fluid to be processed and an outlet for separated fluid, said chamber including a conically tapered open lower end part providing an outlet for separated particles, a spinning device for imparting rotary movement to fluid passing into the chamber through said inlet, at least one settling container communicating with said conically tapered open lower end part of the chamber, said settling container being arranged to receive separated particles, moistening means disposed within said settling container and adapted to cause an increase in weight of said separated particles by agglomeration whereby the speed of descent of said particles in the settling container, due to gravity, is increased, and means providing a direct current electrostatic field in said settling chamber to enhance agglomeration.

References Cited in the file of this patent

UNITED STATES PATENTS

| 253,883 | Nichols | Feb. 21, 1882 |
| 327,531 | Courtney et al. | Oct. 6, 1885 |
| 378,762 | Brown | Feb. 28, 1888 |
| 537,048 | Lee | Apr. 9, 1895 |
| 691,485 | Porbeck | Jan. 21, 1902 |
| 1,232,865 | Stevens | July 10, 1917 |
| 2,207,576 | Brown | July 9, 1940 |
| 2,607,438 | Bailey | June 30, 1948 |

FOREIGN PATENTS

| 23,605 | Great Britain | Oct. 18, 1913 |
| 451,274 | Germany | Oct. 24, 1927 |